(12) United States Patent
Palazzolo

(10) Patent No.: US 6,605,018 B2
(45) Date of Patent: Aug. 12, 2003

(54) POWER TRANSFER UNIT

(75) Inventor: Joseph Palazzolo, Livonia, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/021,886

(22) Filed: Dec. 14, 2001

(65) Prior Publication Data

US 2003/0040395 A1 Feb. 27, 2003

Related U.S. Application Data

(60) Provisional application No. 60/314,500, filed on Aug. 23, 2001.

(51) Int. Cl.$^7$ .............................................. F16H 48/06
(52) U.S. Cl. ..................................................... 475/222
(58) Field of Search ........................................ 475/222

(56) References Cited

U.S. PATENT DOCUMENTS

| | | | |
|---|---|---|---|
| 4,428,452 A | | 1/1984 | Muraoka et al. |
| 4,441,575 A | * | 4/1984 | Suzuki ........................ 180/248 |
| 4,618,021 A | * | 10/1986 | Ashikawa et al. .......... 180/248 |
| 4,682,516 A | | 7/1987 | Okubo |
| 4,911,260 A | * | 3/1990 | Miura et al. ................. 180/249 |
| 5,071,396 A | * | 12/1991 | Kobayashi ................... 475/249 |
| 6,001,043 A | * | 12/1999 | Yun ............................. 475/221 |
| 6,076,623 A | * | 6/2000 | Teraoka et al. ............. 180/233 |

FOREIGN PATENT DOCUMENTS

| | | |
|---|---|---|
| GB | 2 074 517 A | 11/1981 |
| GB | 2 092 968 A | 8/1982 |
| GB | 2 097 736 A | 11/1982 |
| JP | 91-231032 A * | 10/1991 |
| JP | 6135249 A | 5/1992 |
| JP | 93-042840 A * | 2/1993 |

* cited by examiner

*Primary Examiner*—Dirk Wright
(74) *Attorney, Agent, or Firm*—Brinks Hofer Gilson & Lione

(57) ABSTRACT

A motor vehicle power transfer unit for distributing torque between a front wheel drive line and a rear wheel drive line. The power transfer unit includes an input portion, an output portion, a parallel gear set, a non-parallel gear set and a front wheel differential all enclosed within a common housing as an integrally packaged assembly. The input portion is adapted to connect to an output portion of the transmission assembly and output portion is adapted to connect to an input portion of the rear wheel drive line. The parallel gear set, coupled to the input portion transfers power to the non-parallel gear set and to the output portion. The front wheel differential is also coupled to said input portion and includes left and right differential outputs for connecting to the front wheel drive line.

23 Claims, 2 Drawing Sheets

POWER TRANSFER UNIT

CROSS-REFERENCE TO RELATED APPLICATIONS

The present this invention claims priority to U.S. provisional application Serial No. 60/314,500, filed Aug. 23, 2001, entitled "Power Transfer Unit".

BACKGROUND

1. Field of the Invention

The present invention relates to motor vehicle power trains. More specifically, the present invention relates to a power transfer unit in the power train for distributing power to the front and rear wheels of the vehicle.

2. Description of the Prior Art

In the past, most automobiles in the United States utilized a rear wheel drive power delivery scheme. In adapting these rear wheel drive schemes into four wheel drive applications, a transfer case was, and often still is, positioned at the output of the transmission assembly. When engaged, the transfer case diverts a portion of the power coming from the transmission assembly from the rear wheels to the front wheels.

Currently in the United States, a significant portion (if not a majority) of new automobiles are front wheel drive based vehicles. In a front wheel drive vehicle, both the engine and the transmission assembly are typically transversely oriented in the vehicle. By positioning the power plant and transmission assembly transversely in the vehicle, more direct coupling of the transmission assembly to the vehicle's transaxle and front wheels can be achieved. In doing so, a front wheel differential is incorporated directly into the transmission assembly itself.

With front wheel drive vehicles themselves becoming a mature market, a recent trend in the automobile industry has been to adapt these front wheel drive schemes for all or four wheel drive applications. This is accomplished by providing a power transfer unit that diverts a portion of the power from the front wheels to a rear wheel drive shaft and subsequently the rear wheels.

Seen in FIGS. 1a and 1b is a typical prior art power transfer unit 10. Such a power transfer unit 10 couples to the transversely oriented output of the transmission assembly and includes a housing 12 within which is located a gear set 14 comprised of a parallel gear set 16 and a non-parallel gear set 18.

The parallel gear set 16 includes a cylindrical extension 20 that operates as its input and is coupled to the output 22 of the transmission assembly by way of a splining engagement 24. The cylindrical extension 20 itself extends off of a first gear wheel 26 or may be a sleeve to which the gear wheel 26 mounts.

From the first gear wheel 26, power is transferred through a second and third gear wheel, respectively 32 and 34, each supported on bearings 36 for rotation about axes 38 and 40 parallel to the rotational axis 28 of the first gear wheel 26.

The non-parallel gear set 18 includes a bevel ring gear 44 that is mounted to a shaft or sleeve 42 onto which he third wheel gear 34 is also mounted. The bevel ring gear 44 engages a bevel gear 46 mounted to another shaft 48 whose axis is generally perpendicular (and therefore non-parallel) to that of shaft 42. Mounted to an opposing end of the shaft 48 is an output member 50 that includes a flange 52 and appropriately located bolt openings 54. The latter features enable the output member 50 to be bolted to a rear drive shaft (not shown).

As seen in FIG. 1a, the axis 56 along which the parallel gear set 16 engages with one another corresponds with the axis about which the output member 50 rotates. As a result of the locating of the power transfer unit 10 relative of the output of transmission 22, it is clear that this axis 56 may be offset from the centerline of the vehicle. As seen in FIG. 1b, the axis 28 of input into the power transfer unit 10, is vertically or elevationally offset relative to the output axis 58 about which the output member 50 rotates. This "drop" or height decrease results from the relative positioning of the first, second and third helical gears 26, 32 and 34 of the parallel gear set 16. The non-parallel gear set 18 is a hypoid beveled gear set in that the axis of rotation 40 of the bevel ring gear 44 does not intersect the axis 58 of rotation of the bevel gear 46.

While prior power transfer units work sufficiently well for their intended purposes, their construction limits the extent to which their size can be reduced (thereby making the engine bay unavailable for other components). This also limits packaging flexibility of the units themselves. Normally front differentials in transaxles are of the bevel type and require a large amount of axial space. As the transaxle package grows axially, it interferes with having equal length halfshafts and furthermore steering, suspension, and engine mount/roll restrictor placement. By incorporating a planetary style differential with the present invention, additional packaging space becomes available in order to provide adequate space for the helical gear set without adding to the overall transaxle space requirements.

It is therefore an object of the present invention to overcome the limitations of the prior art and provide a power transfer unit having the front differential incorporated therein.

A further object of this invention is to provide a drive system having a primary drive system.

SUMMARY OF THE INVENTION

The present invention overcomes the limitations of the prior art by integrally packaging the primary components of the power transfer unit within a common housing. With the present invention, these primary components include a front wheel differential, a parallel gear set, a non-parallel gear set and input and output members.

The output of the transmission assembly is coupled to the input member and to a gear wheel in the parallel gear set of the power transfer unit. The drive sprocket wheel transfers rotation to a second sprocket wheel through a transfer chain. That second sprocket wheel is mounted on a shaft whose axis is generally parallel to the axis about which the first gear wheel rotates. That shaft then transfers power to the non-parallel gear set.

In the non-parallel gear set, a hypoid gear ring is mounted to the same shaft as the second gear wheel. The hypoid ring gear engages a hypoid pinion gear mounted to a second shaft, this second shaft being oriented generally perpendicularly to the first shaft. On the distal end of the second shaft is the output member of the power transfer unit.

As mentioned above, the power transfer unit of the present invention includes a front wheel differential. Input into the front differential is through a ring gear coupled to rotate with the first gear wheel of the parallel gear set. Planet gears engage the ring gear and are supported by a carrier that in turn forms or is connected to one output of the front differential. The planet gears also engage a sun gear. The sun gear is mounted to the other differential output, one output being coupled to the left front wheel half-shaft with the other output being coupled to the right front wheel half-shaft. During normal straight line driving, these gears do not turn relative to each other. Rather, the entire planetary assembly rotates. During turning of the vehicle, these gears will rotate relative to one another.

By incorporating the front wheel differential into the power transfer unit, increased packaging flexibility results and power can be diverted to the rear wheel drive without exceeding previous packaging constraints. This more readily allows for the conversion of front wheel drive vehicles into all wheel drive vehicles with a minimum impact on the other components packaged in the engine bay.

In one aspect, the present invention is therefore seen to be a power transfer unit comprising an input member adapted to connect to an output portion of a transmission assembly; an output member adapted to connect to an input portion of a rear wheel drive shaft; a front wheel differential; a non-parallel gear set; a parallel gear set; and all of the input member, the output member, the front wheel differential, the non-parallel gear set and the parallel gear set being integrally packaged together.

Additional objects and features of the present invention will be readily apparent to those skilled in the art from a review of the attached drawings, the following detailed description and the appended claims.

DETAILED DESCRIPTION OF THE PREFERRED EMBODIMENTS

Figure 1A:
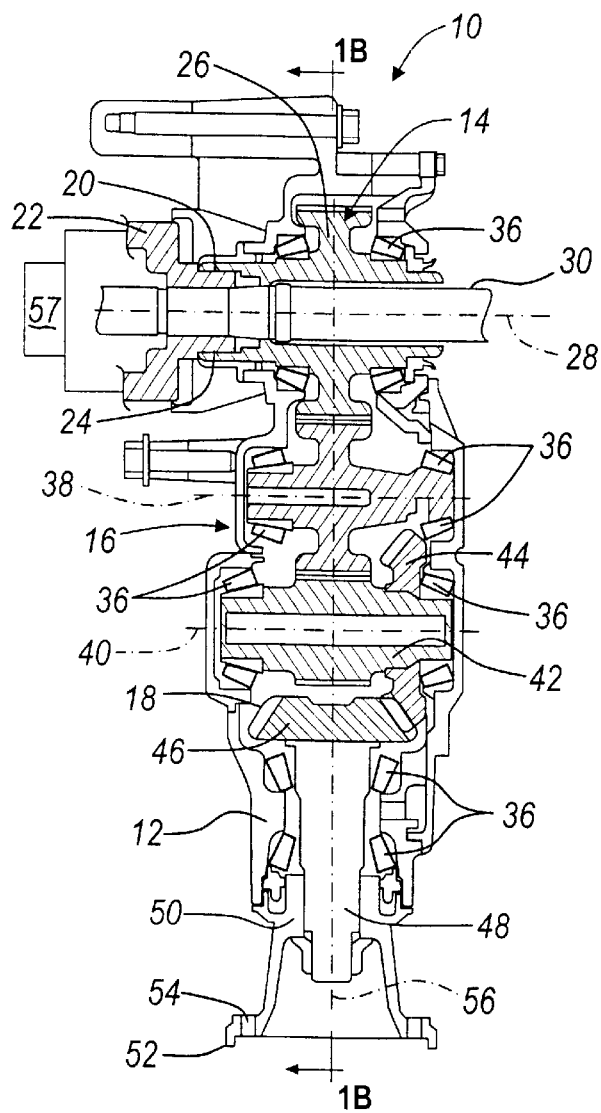
FIG. 1a is a cross-sectional view of a power transfer unit according to the prior art.
Figure 1B:
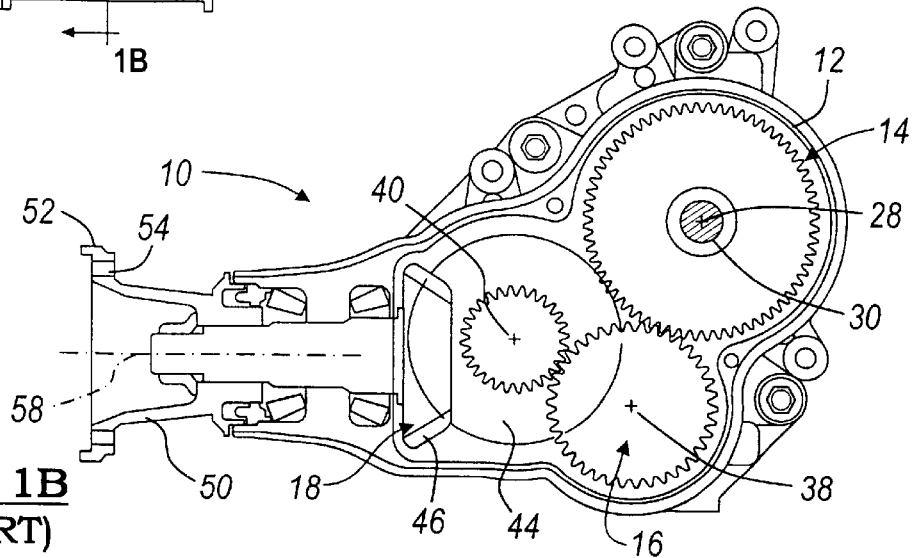
FIG. 1b is a cross-sectional view, taken generally along line 1b—1b in FIG. 1a, further illustrating a power transfer unit according to the prior art.
Figure 2:
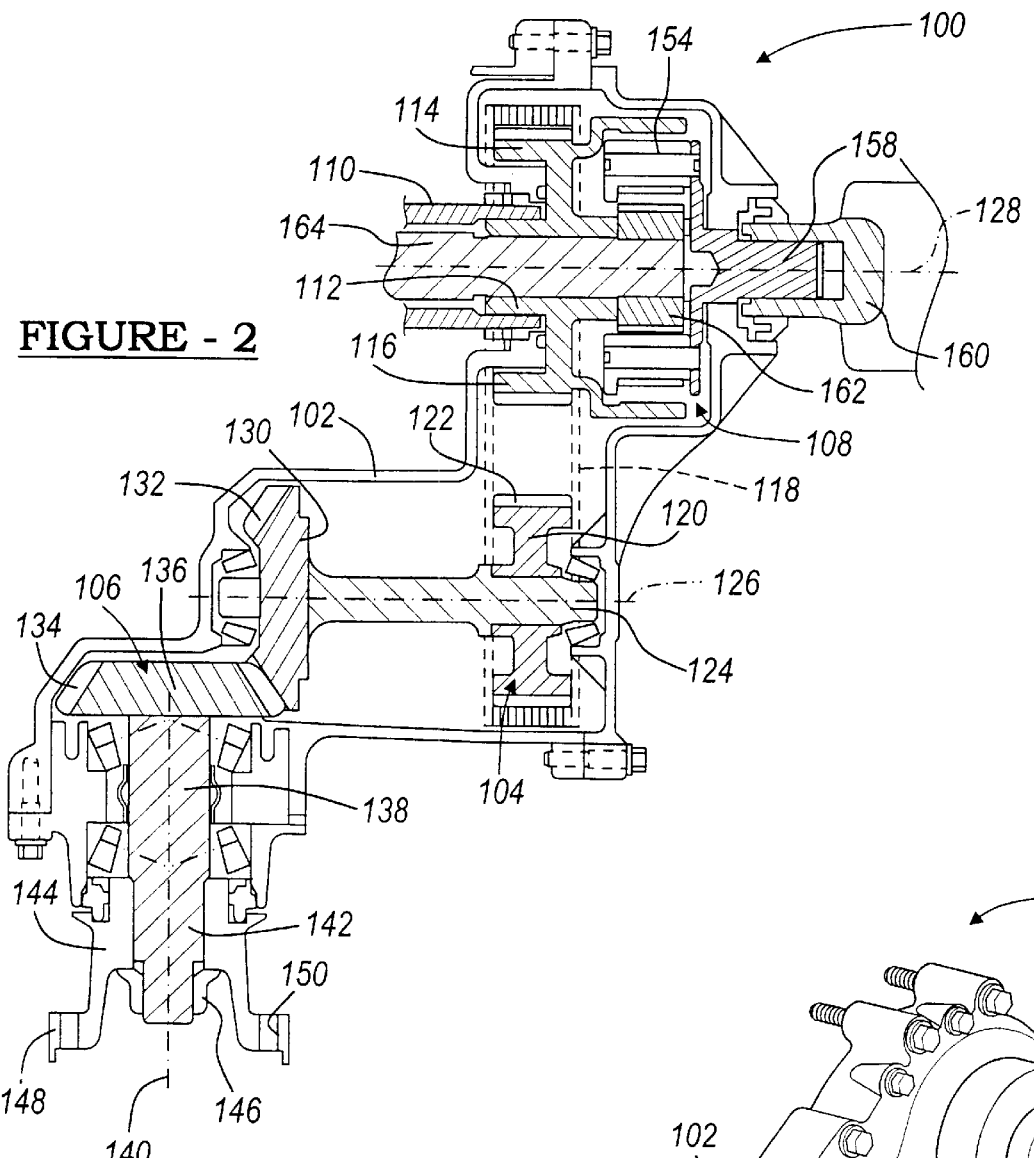
FIG. 2 is a cross-sectional view of a power transfer unit according to the principles of the present invention.
Figure 3:
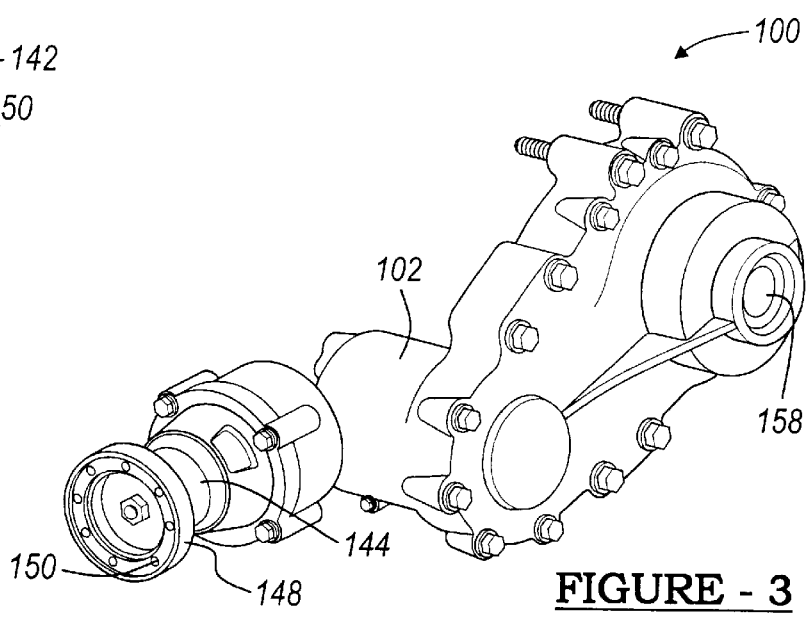
FIG. 3 is a perspective view of the power transfer unit seen in FIG. 2.

Referring now to the drawings, FIGS. 2 and 3 illustrate a power transfer unit 100 incorporating the principles of the present invention. The power transfer unit 100 includes a common housing 102 in which the primary components of the unit 100 are integrally packaged. These components principally include a parallel gear set 104, a non-parallel gear set 106 and a front wheel differential assembly 108.

As used herein, the term "parallel gear set" is intended to refer to any mechanism (including, without limitation, mechanisms with gear wheels, mechanisms without gear wheels, gear trains, chain gears and belt systems), which transfers power from a first shaft to a second shaft; the first and second shafts define axes that are generally parallel to one another.

As used herein, the term "non-parallel gear set" is intended to refer to any mechanism (including, without limitation, mechanisms with gear wheels, mechanisms without gear wheels, gear trains, chain gears and belt systems for transferring power from a first shaft to a second shaft; wherein the first and second shaft define axes that are not generally parallel to one another.

Referring now to FIG. 2, the primary components of the power transfer unit 100 are all integrally packaged together and provided within a common housing. The input and output members may or may not protrude from the housing depending on the specific application in which the power transfer unit is being employed.

Rotation from an output 110 of the transmission assembly is coupled to an input 112 of the power transfer unit 100. In the embodiment of FIG. 2, the input 112 is an externally splined cylindrical sleeve or hub of a first gear wheel 114 in the parallel gear set 104. Alternatively, the input 112 may be non-unitarily formed with the gear wheel 114. The output 110 is internally splined to engage the input 112.

The first gear wheel 114 is rotatably supported and includes external teeth 116 or other means that aid in transferring rotation, by way of a belt or chain 118 (shown in phantom or equivalent means), to a second gear wheel 120. As specific design criteria dictates, the second gear wheel 120 may be larger, smaller or the same diameter as the first gear wheel 114. The second gear wheel 120 is similarly provided with external teeth 122 to engage the chain 118. The second gear wheel 120 is also mounted on a shaft 124 rotatably supported within the housing. The axis 126 of the shaft 124 is generally parallel to the axis 128 of rotation of the first gear wheel 114 and the input 112 and these features make up the parallel gear set 104.

When incorporated into a motor vehicle, and as other design criteria may dictate, the height or elevation of the axes 126 and 128, relative to the vehicle and each other, may be the same or different. In the situation where axis 126 is lower than axis 128, it will be appreciated that the parallel gear set 104 operates as a chain drop. This is illustrated in both FIGS. 2 and 3.

As an alternative to the chain 118 or belt, a series of gear wheels or a gear train may be employed. Additionally, the relative diameters of the gear wheels 114 and 120 may be the same or different, as determined by design criteria not relevant to an understanding of the present invention.

The shaft 124 is further used to transfer power to the non-parallel gear set 106. In the embodiment of FIG. 2, the non-parallel gear set 106 is a hypoid bevel gear set. The non-parallel gear set 106 therefore includes a first bevel gear 130 mounted to the shaft 124 and which, through intermeshing teeth 132 and 134, engages a second bevel gear 136. The second bevel gear 136 is secured by conventional means to a second shaft 138 and the second shaft 138 is oriented along a generally perpendicular axis 140 to the first shaft 124. The shafts 124 and 138 are offset and the illustrated non-parallel gear set 106 and is accordingly a hypoid bevel gear set.

In order to provide the output for the power transfer unit 100, the distal end 142 of the second shaft 138 is externally splined to receive and engage an output member 144. Retention of the output member 144 to the second shaft 138 can be by any conventional means including a retainer nut 146 threadably attached to the second shaft 138 as seen in FIG. 2. A flange 148 provided with a series of bolt holes 150 enables the output member 144 to be readily connected to a rear drive shaft (not shown).

As briefly mentioned above, the power transfer unit 100 of the present invention also integrally includes a front wheel differential assembly 108. The front wheel differential assembly 108, illustrated in conjunction with the present invention, is a planetary gear differential, although other styles and varieties of differentials, such as bevel gear differentials and others within the scope hereof.

Input into the differential assembly 108 is through an internally toothed ring gear 152. The gear ring 152 is unitarily formed with, or alternatively secured to, the input 120 of the power transfer unit 100. Provided in this manner, the ring gear 152 will rotate with the input 120 and the first gear wheel 114 as rotation is received from the output 110 of the transmission assembly. Planet gears 154 engage the ring gear 152 and are rotatably supported by a carrier 156. The carrier 156 in turn forms or is connected to one of the outputs of the differential assembly 108. In FIG. 2, this output 158 from the carrier 156 is in the form of a shaft coupled via splined engagement to drive the right front wheel half-shaft 160.

The planetary gears 154 also engage a sun gear 162 and the sun gear 162 is mounted (through a splined or other engagement) to an end of the left front wheel half-shaft 164. Accordingly, during turning of the vehicle, the planetary and sun gears 154 and 162 will rotate relative to one another permitting the inside and outside wheels (relative to the turn) of the vehicle to rotate at different speeds.

By incorporating the front wheel differential assembly 108 integrally into the power transfer unit 100, the numerous benefits over prior constructions are seen.

Increased packaging flexibility results and power can be diverted to the rear wheel drive portion of the power transfer unit without exceeding previous packaging constraints. This more readily allows for the conversion of front wheel drive vehicles into all wheel drive vehicles with a minimum impact on the other components packaged in the engine bay.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

I claim:

1. A motor vehicle power transfer unit for receiving torque from a transmission assembly and for distributing torque between a front wheel drive line and a rear wheel drive line, said power transfer unit comprising:
    an input member adapted to connect to an output portion of the transmission assembly;
    an output member adapted to connect to an input portion of the rear wheel drive line;
    a parallel gear set coupled to said input member;
    a non-parallel gear set coupled between said parallel gear set and said output portion;
    a front wheel differential coupled to said input member and including left and right differential outputs adapted to connect to the front wheel drive line; and
    a housing commonly enclosing together said input member, said output portion, said parallel gear set, said non-parallel gear set and said front wheel differential in an integrally packaged assembly separate from the transmission assembly.

2. The power transfer unit of claim 1 wherein said non-parallel gear set is a bevel gear set.

3. The power transfer unit of claim 2 wherein said bevel gear set is a hypoid bevel gear set.

4. The power transfer unit of claim 1 wherein said parallel gear set is coupled to said non-parallel gear set which is in turn coupled to said output member.

5. The power transfer unit of claim 1 wherein said parallel input axis is elevated relative to said parallel output axis when said power transfer unit is incorporated into the motor vehicle.

6. The power transfer unit of claim 1 wherein said parallel gear set is a gear drop.

7. The power transfer unit of claim 1 wherein said front wheel differential is a planetary gear set.

8. A motor vehicle power transfer unit for distributing torque from a transmission assembly between a front wheel drive line and a rear wheel drive line, said power transfer unit comprising:
    an input member adapted to coaxially connect to an output portion of the transmission assembly;
    an output member adapted to connect to an input portion of the rear wheel drive line;
    a parallel gear set defining generally parallel input and output axes;
    a non-parallel gear set defining generally non-parallel input and output axes;
    one of said parallel and non-parallel gear sets being coupled to said input member and subsequently coupled to the other of said parallel and non-parallel gear sets, said other of said parallel and non-parallel gear sets being coupled to said output member;
    a front wheel differential including a differential input coupled to said input member, said front wheel differential also including left and right differential outputs adapted to connect to the front wheel drive line; and
    a common housing enclosing all of said input member, said output member, said front wheel differential, said non-parallel gear set and said parallel gear together in an integrally packaged assembly.

9. The power transfer unit of claim 8 wherein said non-parallel gear set is a bevel gear set.

10. The power transfer unit of claim 8 wherein said bevel gear set is a hypoid bevel gear set.

11. The power transfer unit of claim 8 wherein said parallel gear set is a chain gear.

12. The power transfer unit of claim 8 wherein said parallel gear set includes a first gear wheel unitarily formed with said input member.

13. The power transfer unit of claim 8 wherein said input member is unitarily formed with said differential input.

14. The power transfer unit of claim 8 wherein said parallel gear set is coupled to said non-parallel gear set which is in turn coupled to said output member.

15. The power transfer unit of claim 8 wherein said parallel input axis is elevated relative to said parallel output axis when said power transfer unit is incorporated into the motor vehicle.

16. The power transfer unit of claim 8 wherein said parallel gear set is a gear drop.

17. The power transfer unit of claim 8 wherein said differential input is unitarily formed with a portion of said parallel gear set.

18. The power transfer unit of claim 8 wherein said front wheel differential is a planetary gear set.

19. A drive system for a motor vehicle comprising:
    a prime mover;
    a transmission assembly coupled to said prime mover and including a rotatable output portion;
    a front drive line including a pair of front half-shaft assemblies coupled to one each of a pair of front wheels, said front drive line operating as a primary drive line for the motor vehicle;
    a rear drive line operating as a secondary drive line, said rear drive line including a rear drive shaft connected to a pair of rear half-shaft assemblies, and a pair of rear wheels coupled to one each of said rear half-shaft assemblies;
    an input member coaxially connected to said output portion of the transmission assembly;
    an output member adapted to couple to said rear drive line;

one of said parallel and non-parallel gear sets being coupled to said input member and subsequently coupled to the other of said parallel and non-parallel gear sets, said other of said parallel and non-parallel gear sets being coupled to said output member;

a parallel gear set defining parallel input and output axes;

a non-parallel gear set defining non-parallel input and output axes;

a front wheel differential including a differential input coupled to said input member for rotation therewith, said front wheel differential also including left and right differential outputs adapted to connect to one each of said pair of front halfshafts; and a common housing enclosing all of said input member, said output member, said front wheel differential, said non-parallel gear set and said parallel gear together in an integrally packaged power transfer unit separate from the transmission assembly.

20. A motor vehicle power transfer unit for receiving torque from a transmission assembly and for distributing torque between a front wheel drive line and a rear wheel drive line, said power transfer unit comprising:

an input member adapted to connect to an output portion of the transmission assembly;

an output member adapted to connect to an input portion of the rear wheel drive line;

a parallel gear set coupled to said input member, said parallel gear set being a chain gear;

a non-parallel gear set coupled between said parallel gear set and said output portion;

a front wheel differential coupled to said input member and including left and right differential outputs adapted to connect to the front wheel drive line; and a housing commonly enclosing together said input member, said output portion, said parallel gear set, said non-parallel gear set and said front wheel differential in an integrally packaged assembly separate from the transmission assembly.

21. A motor vehicle power transfer unit for receiving torque from a transmission assembly and for distributing torque between a front wheel drive line and a rear wheel drive line, said power transfer unit comprising:

an input member adapted to connect to an output portion of the transmission assembly;

an output member adapted to connect to an input portion of the rear wheel drive line;

a parallel gear set coupled to said input member, said parallel gear set including a first gear wheel unitarily formed with said input member;

a non-parallel gear set coupled between said parallel gear set and said output portion;

a front wheel differential coupled to said input member and including left and right differential outputs adapted to connect to the front wheel drive line; and a housing commonly enclosing together said input member, said output portion, said parallel gear set, said non-parallel gear set and said front wheel differential in an integrally packaged assembly separate from the transmission assembly.

22. A motor vehicle power transfer unit for receiving torque from a transmission assembly and for distributing torque between a front wheel drive line and a rear wheel drive line, said power transfer unit comprising:

an input member adapted to connect to an output portion of the transmission assembly;

an output member adapted to connect to an input portion of the rear wheel drive line;

a parallel gear set coupled to said input member;

a non-parallel gear set coupled between said parallel gear set and said output portion;

a front wheel differential coupled to said input member and including left and right differential outputs adapted to connect to the front wheel drive line, said differential including a differential input unitarily formed with said input member; and a housing commonly enclosing together said input member, said output portion, said parallel gear set, said non-parallel gear set and said front wheel differential in an integrally packaged assembly separate from the transmission assembly.

23. A motor vehicle power transfer unit for receiving torque from a transmission assembly and for distributing torque between a front wheel drive line and a rear wheel drive line, said power transfer unit comprising:

an input member adapted to connect to an output portion of the transmission assembly;

an output member adapted to connect to an input portion of the rear wheel drive line;

a parallel gear set coupled to said input member;

a non-parallel gear set coupled between said parallel gear set and said output portion;

a front wheel differential coupled to said input member and including left and right differential outputs adapted to connect to the front wheel drive line, said differential including a differential unitarily formed with a portion of said parallel gear set; and a housing commonly enclosing together said input member, said output portion, said parallel gear set, said non-parallel gear set and said front wheel differential in an integrally packaged assembly separate from the transmission assembly.

* * * * *